US006675767B2

(12) United States Patent
Gatellier et al.

(10) Patent No.: US 6,675,767 B2
(45) Date of Patent: Jan. 13, 2004

(54) INTERNAL-COMBUSTION ENGINE WITH FUEL INJECTION DEVICE

(75) Inventors: Bertrand Gatellier, Bougival (FR); Bruno Walter, La Garenne Colombes (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 10/385,845

(22) Filed: Mar. 12, 2003

(65) Prior Publication Data

US 2003/0172902 A1 Sep. 18, 2003

(30) Foreign Application Priority Data

Mar. 15, 2002 (FR) .............................. 02 03213

(51) Int. Cl.⁷ ................................. F02B 3/00
(52) U.S. Cl. ...................... 123/298; 123/299; 123/276; 123/285
(58) Field of Search ................ 123/298, 299, 123/276, 285, 294

(56) References Cited

U.S. PATENT DOCUMENTS

| | | | |
|---|---|---|---|
| 4,473,046 A | | 9/1984 | Aoyama |
| 4,516,549 A | * | 5/1985 | Brear .................. 123/276 |
| 4,858,578 A | | 8/1989 | Schereer |
| 5,373,820 A | * | 12/1994 | Sakamoto et al. ........ 123/295 |
| 5,809,962 A | * | 9/1998 | Abbott et al. ........... 123/193.6 |
| 5,875,743 A | | 3/1999 | Dickey |
| 5,906,183 A | | 5/1999 | Echtle |
| 6,536,404 B2 | * | 3/2003 | Liu et al. .............. 123/263 |

FOREIGN PATENT DOCUMENTS

| | | |
|---|---|---|
| DE | 1055873 | 4/1959 |
| EP | 0683306 | 11/1995 |
| JP | 03149315 | 6/1991 |
| JP | 05149137 | 6/1993 |
| SU | 1576697 | 7/1990 |

* cited by examiner

Primary Examiner—Bibhu Mohanty
(74) Attorney, Agent, or Firm—Antonelli, Terry, Stout & Kraus, LLP

(57) ABSTRACT

The present invention relates to a direct-injection internal-combustion engine comprising at least a cylinder (10), a cylinder head (12), a piston (22) sliding, in this cylinder, intake means (14, 18) for at least one gaseous fluid, a multijet fuel-injection nozzle (24) comprising a fuel jet angle ($\beta$) and a fuel jet nappe angle ($a_1$), and a combustion chamber delimited on one side by the upper face of piston (22), said face comprising a teat (36) pointing towards the cylinder head and arranged in a concave bowl (34).

According to the invention, jet angle ($\beta$) between two consecutive axes (32) of fuel jets (30) is at least equal to $$\frac{10\pi}{FD},$$

where FD is the diameter of the bottom of bowl (34), and nappe angle ($a_1$) is less than or equal to $$2 Arctg \frac{CD}{2F},$$

where CD is the diameter of cylinder (10) and F the distance between the point of origin of the fuel jets and the position of the piston corresponding to a crankshaft angle of 50° in relation to the top dead center.

5 Claims, 1 Drawing Sheet

INTERNAL-COMBUSTION ENGINE WITH FUEL INJECTION DEVICE

FIELD OF THE INVENTION

The present invention relates to an internal-combustion engine with a direct fuel injection device.

More particularly, it relates to a direct-injection internal-combustion engine comprising at least a cylinder, a cylinder head, a piston sliding in this cylinder, intake means for at least one gaseous fluid, a multijet fuel-injection nozzle comprising a fuel jet angle and a fuel jet nappe angle, and a combustion chamber delimited on one side by the upper face of the piston comprising a teat pointing towards the cylinder head and arranged in a concave bowl.

BACKGROUND OF THE INVENTION

In the case of Diesel engines working in homogeneous mode, it is well-known to mix the fuel coming from a multijet injection nozzle with the gaseous fluid(s) admitted into the combustion chamber of this engine, such as air or a mixture of recirculated exhaust gas (EGR) and air, so as to obtain a homogeneous fuel mixture before combustion starts.

This fuel mixture homogeneity allows to reduce the consumption and to minimize the production of nitrogen oxides (NOx) and of particles.

In order to favour mixing of the fuel with the gaseous fluid admitted in the combustion chamber, engines comprising injection nozzles with a large number of holes, of the order of 20, have been developed.

This injection nozzle type allows to improve the running conditions of the engine in homogeneous combustion mode, but it leads to wetting of the cylinder wall by the fuel droplets, notably when the inner aerodynamics of the combustion chamber uses a swirling motion of the gaseous fluid admitted, which throws these droplets onto this wall.

This wetting of the wall by the fuel does not only lead to a degradation of the behaviour of the lubricant present on this wall and to the creation of soots, but also to an emissions increase and to a decrease in the engine performance, notably by increasing its fuel consumption.

In cases where this engine works under conventional combustion conditions, notably at high loads so as to reach a high torque and a high specific power, such a number of jets is not compatible with this combustion mode.

In fact, when the axes of the fuel jets are circumferentially too close to one another, the ends of these jets overlap each other in the bowl, thus preventing mixing with the gaseous fluid and creating too fuel-rich zones, which leads to the formation of soots.

SUMMARY OF THE INVENTION

The present invention is aimed to overcome the aforementioned drawbacks by means of an engine of simple and economical design.

This engine can run in two combustion modes, the change from one to the other being carried out essentially by shifting the injection phases.

The geometry selected for the jets is based on the use of an injection nozzle of small nappe angle associated with a particular number of jets so as to, on the one hand, provide sufficiently homogeneous mixing of the fuel with the gaseous fluid(s) admitted (air or recirculated exhaust gas and air) while preventing wetting of the cylinder wall by the fuel in homogeneous combustion mode and, on the other hand, to provide good independence of each fuel jet in conventional combustion.

The invention therefore relates to a direct-injection internal-combustion engine comprising at least a cylinder, a cylinder head, a piston sliding in this cylinder, intake means for at least one gaseous fluid, a multijet fuel-injection nozzle comprising a fuel jet angle and a fuel jet nappe angle, and a combustion chamber delimited on one side by the upper face of the piston, said face comprising a teat pointing towards the cylinder head and arranged in a concave bowl, characterized in that the fuel jet angle is at least equal to $$\frac{10\pi}{FD},$$

where FD is the diameter of the bowl bottom, and the nappe angle is less than or equal to $$2 Arctg \frac{CD}{2F},$$

where CD is the diameter of the cylinder and F is the distance between the point of origin of the fuel jets and the position of the piston corresponding to a crankshaft angle of 50° in relation to the top dead center.

Preferably, the fuel jet nappe angle can be less than or equal to 120°.

Advantageously, the nappe angle can range between 40° and 100°.

The angle at the vertex of the teat can be selected greater than the nappe angle by a value ranging between 0° and 30°.

The axes of the fuel jets can form an angle of intersection of the order of 5° with the flank of the teat.

BRIEF DESCRIPTION OF THE FIGURES

Other features and advantages of the invention will be clear from reading the description hereafter, given by way of non imitative example, with reference to the accompanying drawings wherein.

DETAILED DESCRIPTION

Figure 1:
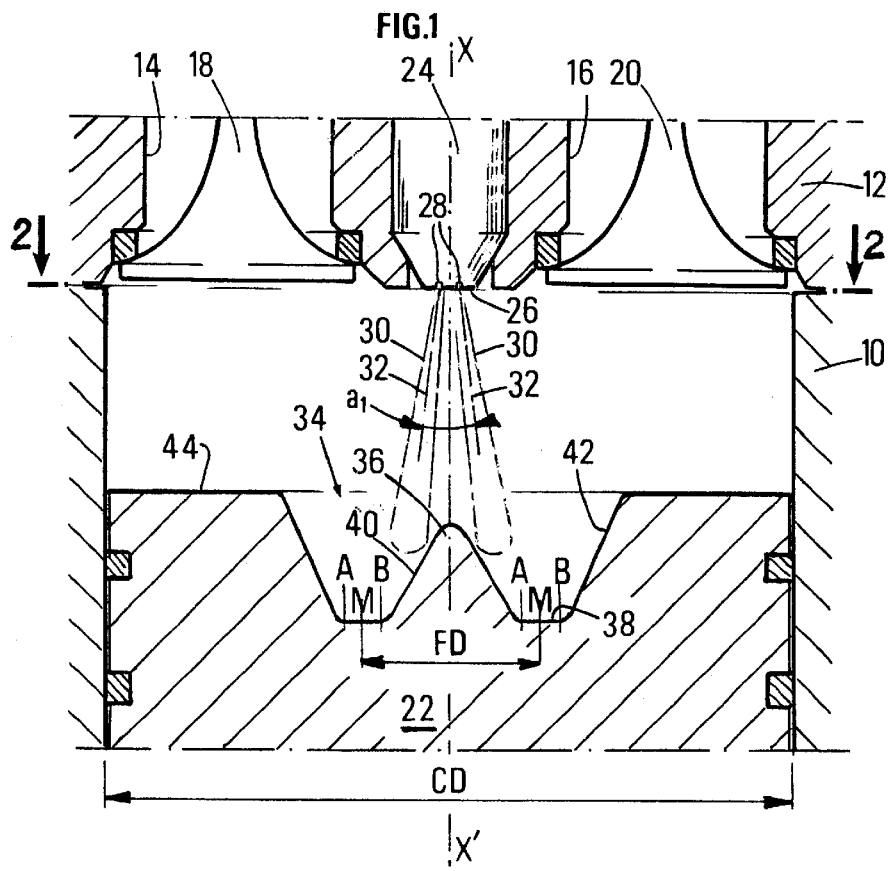
FIG. 1 diagrammatically shows an internal-combustion engine with a fuel injection nozzle according to the invention.
Figure 2:
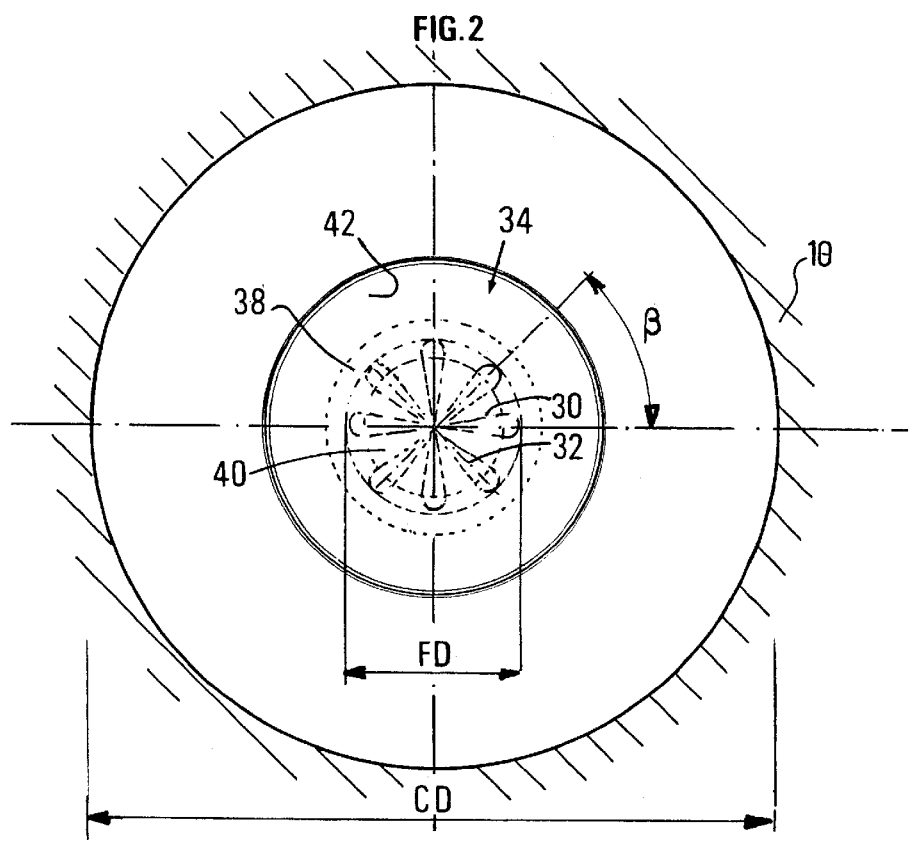
FIG. 2 is a cross-sectional view along line 2—2 of FIG. 1.

With reference to FIGS. 1 and 2, a direct-injection internal-combustion engine of Diesel type comprises at least a cylinder 10 of axis XX' and of diameter CD, a cylinder head 12, at least one intake manifold 14 for at least one gaseous fluid such as air or a mixture of recirculated gas (EGR) and air, at least one exhaust manifold 16, opening and closing of the manifolds being controlled by a means such as an intake valve 18 and an exhaust valve 20 respectively, a piston 22 sliding in cylinder 10 and a fuel-injection nozzle 24.

The fuel-injection nozzle, which is preferably arranged in line with axis XX' of the cylinder, comprises in the vicinity of its nose 26 a multiplicity of orifices or holes 28 through which the fuel is sprayed in the combustion chamber in form of jets 30 whose general axis is shown by axis line 32.

The fuel-injection nozzle is of the type with a small nappe angle a, and it is so selected that the wall of cylinder 10 is never wetted by the fuel for any position of the piston ranging between +50° and +α or between −50° and −α, where α represents the crankshaft angle for the injection phase selected in relation to the top dead center (TDC), this angle α being greater than 50° and less than or equal to 180° to obtain a homogeneous type combustion.

If CD represents the diameter (in mm) of cylinder 10 and F the distance (in mm) between the point of origin of fuel jets 30 and the position of the piston corresponding to a crankshaft angle of 50°, nappe angle $a_1$ (in degrees) will be less than or equal to $$2 Arctg \frac{CD}{2F}.$$

A typical angle range for nappe angle $a_1$ is at the most 120° and it preferably ranges between 40° and 100°.

The combustion chamber is delimited by the inner face of cylinder head 12, the circular wall of cylinder 10 and the upper face of piston 22.

This upper face of the piston comprises a concave bowl 34 inside which is arranged a teat 36 that points towards cylinder head 12 and is arranged at the center of this bowl.

In the example shown, the general axis of bowl 34, the axis of injection nozzle 24 and the axis of teat 36 merge with axis XX' of the cylinder but, of course, the axes of the bowl, of the injection nozzle and of the teat may not be coaxial to that of the cylinder, the main thing being an arrangement such that the general axis of the fuel jet nappe, the axis of the teat and the axis of the bowl are coaxial.

Teat 36, generally truncated, comprises a preferably rounded vertex extended, in the direction of the bottom 38 of the bowl, by a substantially rectilinear inclined flank 40, then, from bowl bottom 38, by a substantially rectilinear inclined lateral wall 42 that joins a substantially horizontal surface 44 of the upper face of piston 22.

In the example of FIG. 1, bowl bottom 38 consists of a substantially plane annular face sectionally delimited by points A and B, and the diameter FD of this bottom is determined at the level of the mean diameter of this surface, i.e. point M mid-point of segment AB.

If this bowl bottom consists of a rounded concave surface, diameter FD of the bowl bottom is measured at the level of the lowest point of this concave surface, i.e. the furthest from cylinder head 12.

The angle at the vertex of teat 36 and the angle of inclination of lateral wall 42 of bowl 34 are substantially suited to the nappe angle of fuel jets 30 so that the fuel is injected substantially along flank 40 of the teat, then it flows back along lateral wall 42 of the bowl.

The angle at the vertex of the teat is selected so as to be greater than nappe angle $a_1$ of the fuel jets by a value ranging between 0° and 30°, and the angle of inclination of lateral wall 42 of bowl 34 is less than 45°.

The nappe angle is understood to be the angle at the vertex formed by the cone from the injection nozzle and whose fictitious peripheral wall passes through all the axes of the fuel jets.

Axes 32 of jets 30 preferably form an angle of intersection of the order of 5° with flank 40 of teat 36.

As already mentioned, it is necessary for the circumferential angular deviations of the jets to be provided in such a way that these jets do not overlap each other in the bowl.

The applicant has therefore determined, by calculation, the ideal angular deviation β between two consecutive axes 32 of fuel jets 30 allowing to obtain, on the one hand, satisfactory running conditions for the engine in conventional combustion mode and, on the other hand, to provide homogeneous mixing of the fuel with the gaseous fluid such as air or a mixture of recirculated exhaust gas (EGR) and air. This angular deviation is to considered in a plane orthogonal to axis XX' (see FIG. 2).

Associated with this injection nozzle, the applicant has also determined an ideal bowl with a bowl bottom diameter FD.

The minimum angle β (in radian) between the consecutive jet axes is thus $$\frac{10\pi}{FD}$$

(with FD in mm).

The number $N_t$ of holes 28 of injection nozzle 24, referred to as calculated number of holes, and consequently the number of jets 30 evenly distributed circumferentially around the axis of the injection nozzle, can then be calculated from this angle β.

If $N_t$ is not an integer, a real number of holes corresponding to the nearest lower value is determined.

By way of example, if the calculated number of holes $N_t$ is 5.8, the nearest integer is 5 and an injection nozzle with 5 holes is therefore used.

The combined use of the injection nozzle with a relatively small nappe angle $a_1$ and of an injection nozzle with a real number of holes as defined above admits of a conventional combustion mode for a fuel injection close to the top dead center (TDC) while improving mixing of the fuel with the gaseous fluid and preventing the jets from overlapping each other.

Furthermore, this configuration allows to avoid the presence of liquid fuel on the cylinder wall while affording great pollution control and engine performance possibilities, notably in homogeneous combustion mode.

At full load and at high loads, the engine allows good carry-over of the vaporized fuel, thus favouring its mixing with the gaseous fluid so as to obtain a good combustion rate and great mixture strengths indicating a good use of the gaseous fluid admitted. At partial loads, a reduced nappe angle combined with the injection nozzle as described above allows to prevent wetting of the cylinder wall and to provide mixing of the fuel with the gaseous fluid.

What is claimed is:

1. A direct-injection internal-combustion engine comprising at least a cylinder (10), a cylinder head (12), a piston (22) sliding in this cylinder, intake means (14, 18) for at least one gaseous fluid, a multijet fuel-injection nozzle (24) comprising a fuel jet angle (β) and a fuel jet nappe angle ($a_1$), and a combustion chamber delimited on one side by the upper face of piston (22), said face comprising a teat (36) pointing towards cylinder head (12) and arranged in a concave bowl (34), characterized in that fuel jet angle (β) is at least equal to $$\frac{10\pi}{FD},$$

where FD is the diameter of the bottom of bowl (34), and nappe angle ($a_1$) is less than or equal to $$2 \text{Arctg} \frac{CD}{2F},$$

where CD is the diameter of cylinder (10) and F the distance between the point of origin of fuel jets (30) and the position of piston (22) corresponding to a crankshaft angle of 50° in relation to the top dead center.

2. An engine as claimed in claim 1, characterized in that nappe angle ($a_1$) of fuel jets (30) is less than or equal to 120°.

3. An engine as claimed in claim 1, characterized in that nappe angle ($a_1$) ranges between 40° and 100°.

4. An engine as claimed in claim 1, characterized in that the angle at the vertex of teat (36) is selected greater than nappe angle ($a_1$) by a value ranging between 0° and 30°.

5. An engine as claimed in claim 1, characterized in that axes (32) of fuel jets (30) form an angle of intersection of the order of 5° with flank (40) of teat (36).

\* \* \* \* \*